No. 695,384. Patented Mar. 11, 1902.
P. R. GLASS.
TACK DRIVING MECHANISM.
(Application filed Oct. 30, 1900.)
(No Model.) 2 Sheets—Sheet 1.
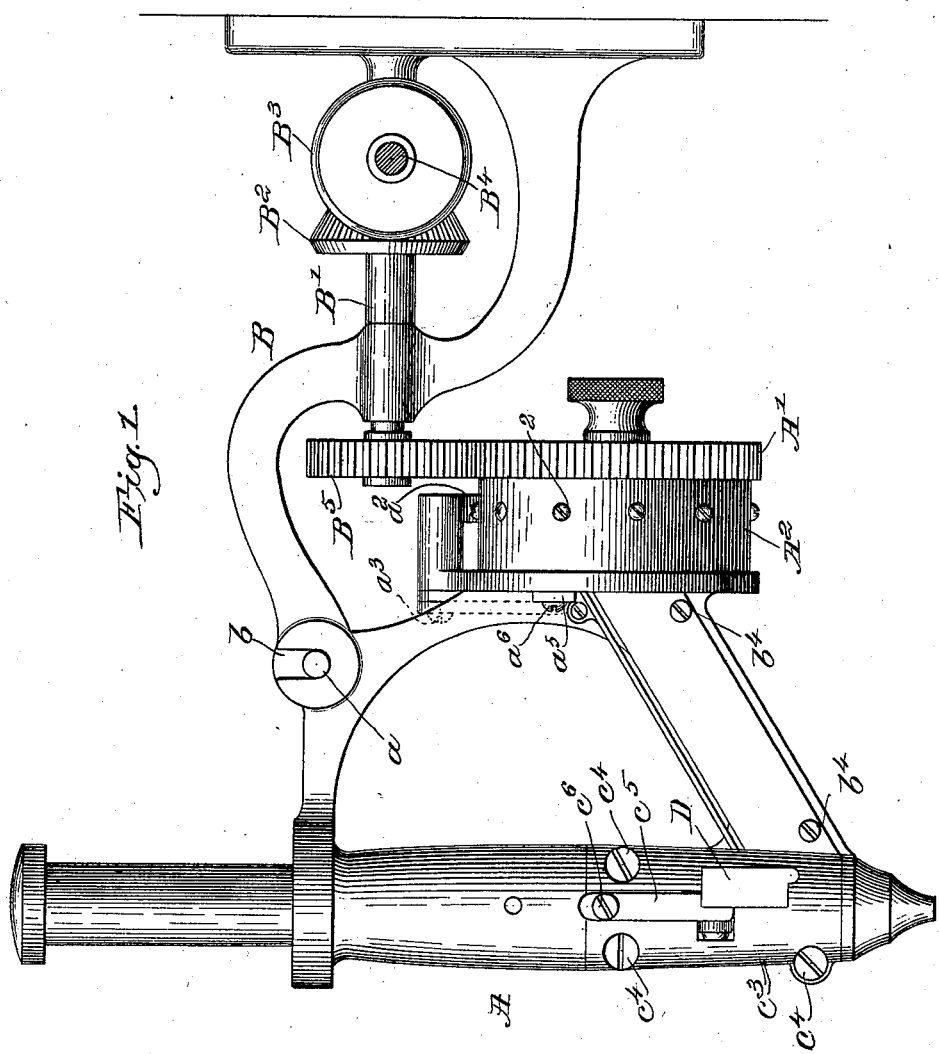
Witnesses.
Thomas J. Drummond.
Edward H. Allen.
Inventor.
Perley R. Glass,
by Crosby & Gregory
Attys.

No. 695,384. Patented Mar. 11, 1902.
P. R. GLASS.
TACK DRIVING MECHANISM.
(Application filed Oct. 30, 1900.)
(No Model.) 2 Sheets—Sheet 2.
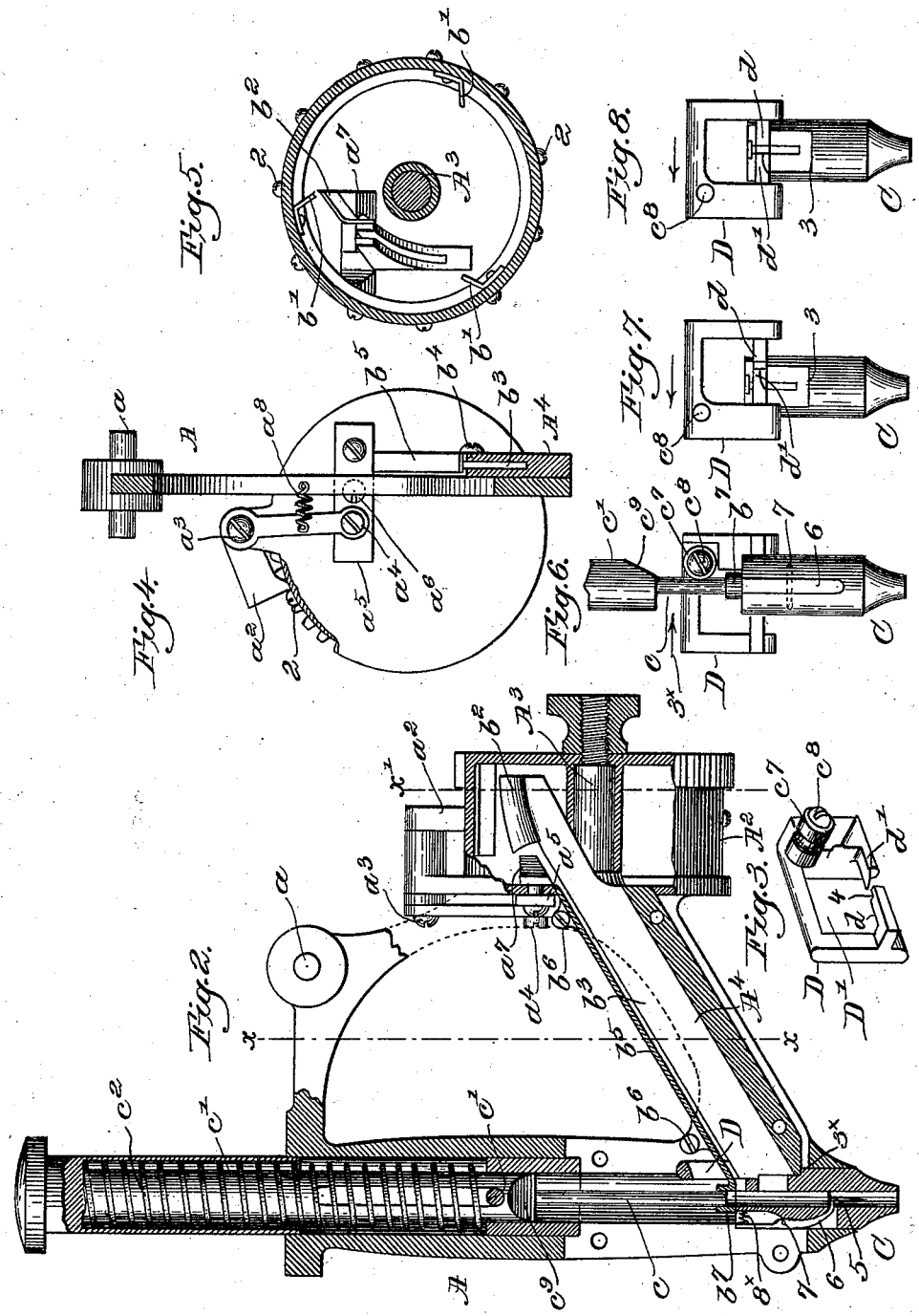
Witnesses.
Thomas J. Drummond.
Edward H. Allen.
Inventor
Penley R. Glass,
by Crosby & Gregory
Atty's.

UNITED STATES PATENT OFFICE.

PERLEY R. GLASS, OF QUINCY, MASSACHUSETTS, ASSIGNOR TO PEERLESS MACHINERY COMPANY, OF CHARLESTON, WEST VIRGINIA, AND NEW YORK, N. Y.

TACK-DRIVING MECHANISM.

SPECIFICATION forming part of Letters Patent No. 695,384, dated March 11, 1902.

Application filed October 30, 1900. Serial No. 34,877. (No model.)

*To all whom it may concern:*

Be it known that I, PERLEY R. GLASS, a citizen of the United States, residing at Quincy, county of Norfolk, State of Massachusetts, have invented an Improvement in Tack-Driving Mechanism, of which the following description, in connection with the accompanying drawings, is a specification, like characters on the drawings representing like parts.

This invention relates to tack-driving mechanism, and has for its object to simplify the construction and operation of the same.

My improved mechanism has a hopper which contains a surplus of tacks, and before using the tool it is hung up in such position that a pinion may engage a gear fixed with relation to the hopper to rotate the latter and cause it to fill the tack-raceway of the tool with a quantity of tacks sufficient or more than sufficient to effect the lasting of certainly one, if not more, shoes.

Figure 1, in side elevation, represents a tack-driving mechanism hung up in order that the hopper may be actuated to effect the filling with tacks of the tack-receiving raceway. Fig. 2 is a section of Fig. 1 with the hopper-rotating means omitted, the tacks being also omitted from the raceway. Fig. 3 shows the pick-off detached. Fig. 4 is a section to the right of the dotted line $x$, Fig. 2. Fig. 5 is a section in the dotted line $x'$, Fig. 2. Fig. 6 is a detail showing the driver, part of the driver-bar, the pick-off, and the nosepiece of the driver. Figs. 7 and 8 are like details with the pick-off in a different position, the driver-bar and driver being omitted.

The hand part A, of suitable shape to be grasped in the hand of the operator, has provisions to coöperate with the bracket B to enable the hand part to be hung up, the means herein shown being a projection $a$ on the handpiece, which enters a notch $b$ in the bracket, the latter being secured, preferably, to the wall of a building and sustaining a shaft $B'$, having an attached bevel-gear $B^2$, which is engaged by a bevel-gear $B^3$, fast on shaft $B^4$, which in practice may be driven constantly in any usual way from any usual counter-shaft in the building. The shaft $B'$ has a connected pinion $B^5$, which engages a toothed wheel $A'$, carried by a hopper $A^2$, rotatable about a stud $A^3$, extended from the handpiece, and preferably the location of the pivot $a$ and the weight of the structure are such that normally the wheel $A'$ when the handpiece is hung up on the bracket will engage itself automatically and be maintained in driving contact with the pinion $B^5$. The hopper is provided at its interior with any desired number of suitable shelves $b'$, which as the hopper is rotated lift the tacks and carry them upwardly and drop the same upon the apron $b^2$ at the upper end of the raceway $A^4$, the said raceway being represented as a plate having a longitudinal slot, as $b^3$, (see Fig. 4,) and being connected with the handpiece by suitable screws, as $b^4$, the raceway having a cover $b^5$, represented as connected to the handpiece by suitable screws $b^6$, and, as herein represented, the lower end of said cover-plate is extended beyond the path of movement of the driver to be described and has a hollow boss $b^7$, which acts as a guide for the driver in its movement, the apron at the upper end of the raceway standing normally in the hopper at one side of the stud $A^3$. The hopper is shown as provided externally with a series of projections 2, which in the rotation of the hopper as the latter is acting to fill the raceway with tacks meet one end of a lever $a^2$, pivoted at $a^3$, and turn said lever, causing the lower end thereof, engaging a stud-screw $a^4$, to reciprocate a clearer $a^5$, represented as a bar suitably guided and having connected to it by a set-screw $a^6$ (partially shown in Fig. 4) a device $a^7$, located just above the upper edge of the raceway inside the hopper. A spring $a^8$ moves the clearer in opposition to the lever $a^2$. This clearer in its reciprocations knocks off and dislodges any tacks which may fall imperfectly on the top of the raceway or which may override one the other, thus making provision to insure that only the heads of the tacks the bodies of which have properly entered the grooves of the raceway may descend under the cover $b^5$ of the raceway. That the tacks may be taken off singly from the lower end of the raceway I have provided a pick-off, represented detached in Fig. 3 and in different positions of its operation in Figs. 6 to 8.

The inner end of the raceway $A^4$ is represented as sustained by a shoulder $3^×$ in the nosepiece C, containing the driver-passage, into which the tacks are let off one at a time that they may be struck by the driver c each time the driver-bar $c'$ is depressed by a blow of the hand or otherwise, the descent of the driver-bar compressing a spring $c^2$, which quickly acts to lift the driver-bar and driver into their normal starting position. The handpiece has at one side, near its lower end, a detachable plate $c^3$, held in place by suitable screws $c^4$, and said plate is provided with a suitable spring $c^5$, held in place by a suitable screw $c^6$, the lower end of said spring being left free and acting normally upon a roller or other stud $c^7$, surrounding loosely a stud $c^8$, extended from the pick-off D. This pick-off is shown in section in Fig. 2 and in elevation in Figs. 1, 3, 6, 7, and 8. The pick-off consists of a block having at its side next the end of the raceway a notched finger d and a pointed member or finger $d'$. The ends of the pick-off are sustained in suitable guideways formed in the handpiece and in the cover $c^3$. The lower end of the driver-bar is beveled, as at $c^9$, to meet the roller-stud $c^7$ in the descent of the driver and move the pick-off in the direction of the arrow thereon in Figs. 3, 6, 7, and 8, such movement of the pick-off bringing the notch 4 in the finger d opposite the raceway-groove $b^3$, so that the endmost tack of the series may enter the notch 4, while the driver acts on the head of a tack, (represented by 5 in Fig. 2,) which is detained in a yielding manner in the driver-passage of the nose C by means of a detainer 6, represented as a lever having its lower end inturned and pivoted at 7 on a pin, preferably mounted in part of the nose, a spring $8^×$ acting on the detainer, normally keeping the lip at its lower end standing in the driver-passage. After the driver has acted to drive from the detainer the tack 5 the driver-bar is lifted by the spring $c^2$, permitting the spring $c^5$ to act and move the pick-off in a direction opposite the arrow 3, thus permitting the beveled pointed end 8 of the finger $d'$ to pass behind the body of the tack which has entered the notch 4, and acting on said body the beveled end of the finger moves the tack laterally and causes it to drop from the raceway into the driver-passage. The inner side of the finger $d'$ by crossing the end of the raceway tack then occupying the end of the raceway holds that tack and all back of it in the raceway until the driver-bar is again depressed to drive the tack then held on the detainer. The lower extremity of the raceway is extended into and enters the space $D'$ within the pick-off.

In practice while I prefer to shape the acting opposed ends of the fingers d and $d'$ as represented in the drawings, yet their shape may be changed to correspond in shape with any usual pick-off slides commonly used to deliver tacks singly from a raceway.

Having fully described my invention, what I claim as new, and desire to secure by Letters Patent, is—

1. A tack-driving mechanism comprising a driver, a hopper, a raceway connecting the hopper and driver, said hopper having a connected toothed wheel, and a bracket having gearing, combined with means to detachably sustain said tack-driving mechanism in said bracket to effect the engagement of the toothed wheel of the hopper with gearing sustained in the bracket, and means to actuate said gearing so that the hopper may be rotated to fill the raceway with tacks while the tack-driving mechanism is inoperative.

2. In a tack-driving mechanism, a driver, a rotatable hopper, a raceway connecting said hopper and driver, said hopper having on its inner periphery a series of lifting projections, hopper-rotating mechanism, and means to detachably sustain said tack-driving mechanism with its hopper in operative relation to the hopper-rotating mechanism, whereby, as the hopper is rotated, tacks are lifted by the lifting projections and delivered to the raceway.

3. In a tack-driving mechanism, a driver, a rotatable hopper, a raceway extending into the hopper and connecting the same with the driver, said hopper having on its inner periphery a series of lifting projections, hopper-rotating mechanism, means to detachably sustain said hopper in operative relation to the hopper-rotating mechanism, the construction being such that as the hopper rotates the lifting projections deliver tacks to the projecting end of the raceway.

4. In a tack-driving mechanism, a driver, a hopper rotatable about a horizontal axis, a raceway extended into one side of said hopper and connecting the same with the driver, said hopper having on its inner periphery a series of shelves, and hopper-rotating mechanism, and means for detachably sustaining said tack-driving device with the hopper in operative relation with the hopper-rotating mechanism, the construction being such that as the hopper rotates tacks are lifted and deposited on the end of the raceway.

5. In a tack-driving mechanism, a driver, a hopper rotatable about a horizontal axis, a raceway extending into said hopper and terminating in a flattened portion or apron, said raceway connecting the hopper and driver, and said hopper having on its inner periphery a series of shelves combined with hopper-rotating mechanism, and means to detachably sustain the tack-driving mechanism with the hopper in operative relation with the hopper-rotating mechanism, the construction being such that as the hopper is rotated tacks are lifted and deposited upon the apron.

6. In a tack-driving mechanism, a driver, a hopper, a raceway extending into the hopper, hopper-rotating mechanism, means for detachably sustaining said driving mechanism with the hopper in operative relation with the hopper-rotating mechanism, and means within the hopper to deliver tacks to said raceway, a clearer, and means exterior to the hopper to reciprocate said clearer, said means being operated by rotation of the hopper.

7. In a tack-driving mechanism, a frame, a driver supported therein, a raceway to feed tacks to said driver, said raceway being independent from said frame but rigidly secured thereto and a cover for the raceway, said cover being detachably secured to the frame and provided at its lower end with an apertured boss through which the driver reciprocates, said boss acting as a support and guide for the driver.

In testimony whereof I have signed my name to this specification in the presence of two subscribing witnesses.

PERLEY R. GLASS.

Witnesses:
GEO. W. GREGORY,
EDITH M. STODDARD.